United States Patent Office 3,684,482
Patented Aug. 15, 1972

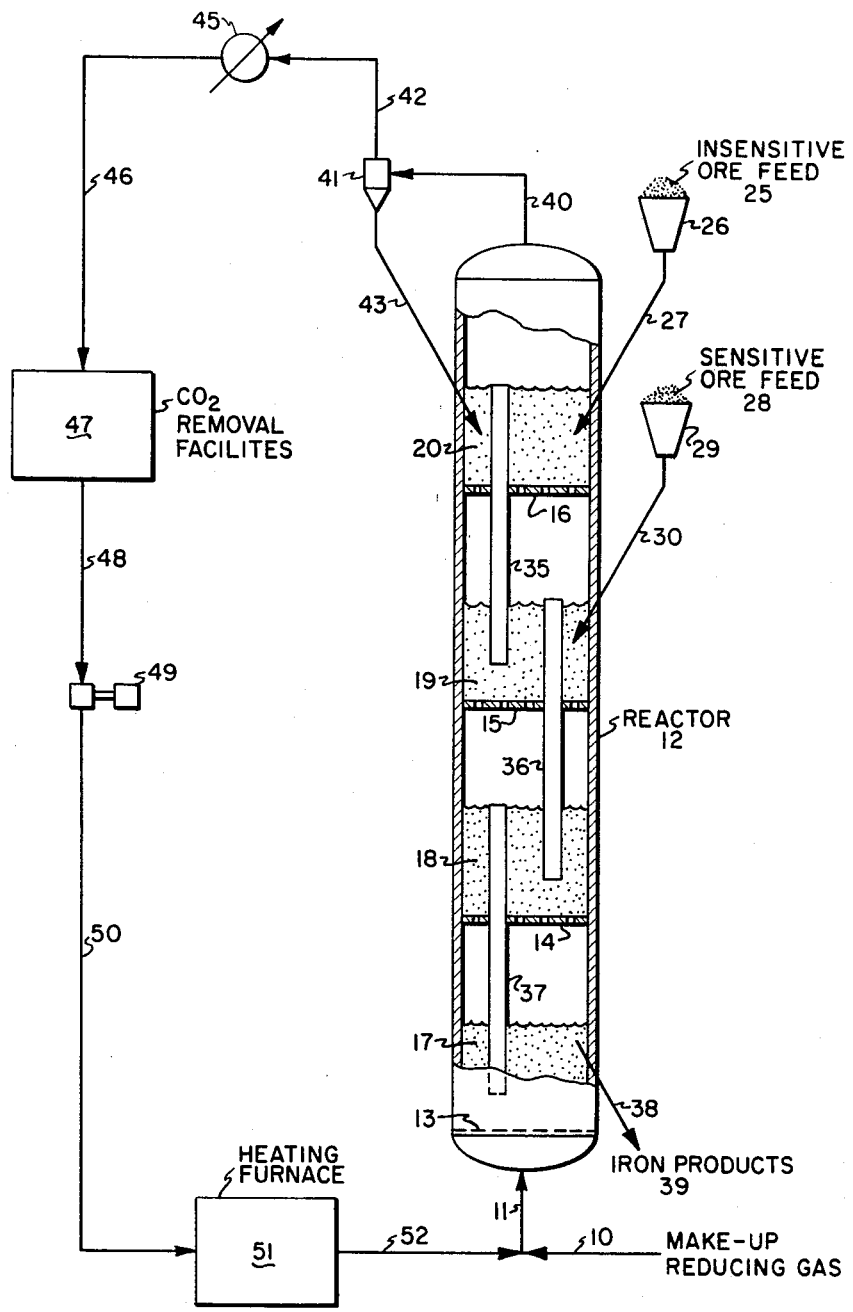

3,684,482
SPLIT FEED TO A FLUIDIZED IRON ORE
REDUCTION PROCESS
John H. Mahar, Scotch Plains, N.J., assignor to Esso
Research and Engineering Company
Continuation-in-part of application Ser. No. 686,084,
Nov. 28, 1967. This application Feb. 24, 1971,
Ser. No. 118,446
Int. Cl. C21b 1/02
U.S. Cl. 136—26
9 Claims

ABSTRACT OF THE DISCLOSURE

Reduction of iron ore to increase metallizations can be obtained by simultaneously reducing two types of ores in one multistage process. Certain types of ores are fed to an initial reduction stage while other types are fed directly to subsequent stages.

CROSS-REFERENCES

This application is a continuation-in-part of application Ser. No. 686,084, filed Nov. 28, 1967, now abandoned.

BACKGROUND OF INVENTION

This invention relates to the production of metallic iron by the direct reduction of particulate oxidic iron ore in a staged reduction process. More particularly, it relates to the simultaneous reduction of multiple types of oxidic iron ores.

It is known to reduce oxidic iron ores in a staged fluidized reduction process. In such a process, particulate iron ore is typically added to the top stage of a series of stages. The ore passes downwardly through a series of fluidized beds and therein is progressively reduced partially or substantially entirely to metallic iron by contact with ascending hot reducing gases in the bed. The reducing gases, added to the final stage of the series, generally contain primarily hydrogen, carbon monoxide or mixtures of these and other gases, and are heated to temperatures ranging generally above about 1300° F., and preferably above about 1500° F., before they are introduced into the final reduction bed.

In the final reduction bed the particulate ore is reduced to substantially metallic iron while the reducing gases are partially oxidized to $H_2O$, carbon dioxide, or both. The partially oxidized reducing gases are progressively cooled and further oxidized as they ascend through the higher fluidized beds of the process. When the gases reach the uppermost or initial bed of the process, they typically contain as much as 50% $H_2O$ or $CO_2$ or mixtures thereof.

It is sometimes preferred to operate a staged fluidized iron ore reduction process with the initial or top stage at temperatures below about 1350° F. and generally between about 800° F. and 1200° F. The gases at this range of temperatures are affected catalytically by the oxidic iron ores to promote a water-gas shift reaction illustrated in Equation 1 below:

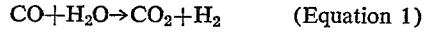

$$CO + H_2O \rightarrow CO_2 + H_2 \qquad \text{(Equation 1)}$$

The gases are withdrawn from the uppermost stage of the process and regenerated by passing them through an alkaline scrubbing means wherein the $CO_2$ is removed. This produces a reducing gas which is enriched in hydrogen content and can be reheated and recycled to the bottom or final reduction stage of the process. It also provides increased thermal efficiencies by removing the top stage gases at relatively low temperatures.

Certain ores have been found to have the unfortunate characteristic of becoming sensitized or resistant to further reduction after they pass through a low temperature stage of a reactor in which the conditions are favorable for the water-gas shift reaction. Exemplary of these ores are essentially specular hematite ores mined in Brazil. This is particularly unfortunate because specular hematite type ores have otherwise particularly desirable characteristics. They are, among other things, notably inexpensive and available in large quantities.

It is an object of this invention to provide a process in which "sensitive ores" can be reduced efficiently. It is a further object of this invention to provide a reduction process in which insensitive ores can be fed into a top or initial fluidized reduction stage or zone at relatively low temperatures to take advantage of the water-gas shift reaction and achieve optimum thermal efficiencies by maintaining the exiting gases at the lowest operable temperatures.

By "sensitive ore" is meant an ore which when treated with low reducing power gases at relatively low temperatures become resistant to further reduction. "Insensitive ore" is ore which when treated with low reducing power gases at relatively low temperatures does not become resistant to further reduction. A test to distinguish sensitive ores is set forth in the detailed description that follows.

SUMMARY OF INVENTION

The present invention contemplates a staged fluidized iron ore reduction process in which two or more types of ores are reduced simultaneously. According to this invention, an ore which is not sensitized at low temperature top stage conditions is added directly to the initial or top bed. A sensitive ore, on the other hand, is added to a lower stage or bed in which nonsensitizing conditions are maintained, i.e., conditions are outside the ranges of temperatures or gas compositions which are conducive to making the ore resistant to further reduction. Thus, the insensitive ore is added to an initial or top stage which is maintained at temperatures ranging below about 1350° F. and preferably in the range from about 800° F. to 1200° F. The gases in the initial stage have reducing powers less than about 2.0 and generally ranging from about 0.8 to 1.5. The term "reducing power" as used herein means the ratio of the moles of reducing constituents of the gases to the moles of oxidizing constituents, e.g., the total moles of carbon monoxide and hydrogen to the total moles of carbon dioxide and $H_2O$. The sensitive or, on the other hand, is added directly to a lower or an intermediate reduction stage in which nonsensitizing conditions are maintained, i.e., temperatures are maintained at above about 1350° F., preferably about 1350° F. to about 1600° F., or the reducing gas composition is maintained at reducing powers greater than about 2.0 and preferably greater than about 4.0.

To avoid causing sticking or sintering of the particles in the final reduction stage it is desirable to introduce the reducing gases at temperatures below about 1700° F. in processes in which most of the endothermic heat of reduction is added as sensible heat with the gases. In such processes, the sensitive ore feed must be preheated to the desired bed temperatures to maintain the bed in which it is added at reasonably high temperatures; otherwise, it is necessary to keep the fraction of sensitive ore at less than about 75% and preferably from about 25% to about 50% of the total ore. In any case it is desirable to add at least about 20% of the total ore as the insensitive type in order to maintain a sufficient flow of such ore through the uppermost or initial reduction stage or bed of the reactor.

Although the process of this invention is advantageous where the reduced ore product is even partially metallized, it is particularly useful in preparing reduced ores in which the iron is over 70%, preferably about 80% to 98%, or higher, metallized.

The particular characteristics which are affected by treatment of certain ores at low temperature and low reducing power gases is not known. It is known, however, that whenever an ore is found to be sensitive the undesirable effects of such sensitivity can be avoided by operating a multistage reduction process in accordance with this invention. The particular mechanism by which the dual feed process of this invention operates is not clear, and applicant does not wish to be bound by any particular theory.

BRIEF DESCRIPTION OF DRAWING

The invention will be better understood by reference to the attached drawing which shows a preferred embodiment in which an insensitive ore and a sensitive ore are simultaneously reduced to substantially metallic iron in a four-stage fluidized iron ore reduction process.

DETAILED DESCRIPTION OF THE INVENTION

Hot reducing gases at about 2800° F., prepared by the catalytic reformation of natural gas with steam, is introduced to the process via line 10 and combined with recycle reducing gases entering at line 52. The mixture of gases is introduced into a multistage fluidized iron ore reduction reaction 12 via inlet line 11. The gases are injected into the reactor at a temperature of about 1700° F. and have approximately the following composition:

|  | Percent |
|---|---|
| $H_2$ | 59.1 |
| CO | 21.8 |
| $CO_2$ | 1.1 |
| $H_2O$ | 4.9 |
| $CH_4$ | 12.2 |
| $N_2$ | 0.9 |

The reducing gases pass upwardly through the multistage reactor and are distributed by means of grids 13, 14, 15 and 16 through fluidized beds 17, 18, 19 and 20, to fluidize and reduce the oxidic iron ore therein. As the gases ascend upwardly through the various beds, the hydrogen and carbon monoxide components are partially oxidized to $H_2O$ and carbon dioxide, respectively. Simultaneously, the gases are partially cooled. Under equilibrium conditions, the temperature in fluid bed 19 is about 1350° F. and the temperature in bed 20 is about 910° F. The reducing power of the gases in the beds is about 3.0 and 1.4 in beds 19 and 20, respectively.

An insensitive ore feed 25, namely a earthy hematite ore from Liberia, is added to the top fluidized bed by means of feeder 26 and standpipe 27. Similarly, sensitive ore feed 28 namely a specular hematite ore from Brazil is added by means of feeder 29 and standpipe 30 to the second fluid bed 19. Both of the ore feeds are of conventional particle size range averaging about 60–70 mesh (Tyler) and ranging generally from about 4 to less than 325 mesh. In this example about 50% of the total ore feed is insensitive ore and the remainder is sensitive ore. The ores are progressively reduced in the various fluidized beds of the staged reactor 12 and descend from bed to bed by means of standpipes 35, 36 and 37, averaging about 40 minutes in each fluidized bed or stage.

The spent reducing gases leave the top reactor stage via outlet line 40 and are separated from any entrained solids particles by means of cyclone 41. The solids are returned from the cyclone 41 to the uppermost fluidized bed 20 by means of standpipe 43. The gases leave the cyclone through line 42 and pass through condenser 45 wherein the gases are cooled to about ambient temperatures to remove $H_2O$. The gases then are transmitted to $CO_2$ removal facilities 47 by means of line 46. The $CO_2$ removal facilities can be any conventional devices for removing gaseous carbon dioxide from a gas stream. Generally, an alkaline scrubbing system is used. After the water and $CO_2$ are removed from the spent reducing gases to regenerate them, they are passed to a compressor 49 via line 48 and pumped back through a heating furnace 51 via line 50 and recycled back to the bottom of the reactor by means of lines 52 and 11.

Generally the entire reduction process equipment are maintained under superatmospheric pressures. Thus, in the various reduction beds the pressure ranges generally above about 50 p.s.i.g. It is sometimes also desirable to employ cyclone separators similar to cyclone 41 between the various fluid beds of the staged process in order to minimize entrainment from bed to bed.

As stated previously, the term "sensitive ore" means ore which when treated with low reducing power gases at relatively low temperatures become resistant to further reduction. Sensitive and insensitive ores can be readily distinguished by means of the following testing procedure:

In accordance with the testing procedure a sample of ore is fluidized in a fluid bed by passing a gaseous mixture containing 67% hydrogen and 33% $H_2O$ (steam) upwardly through the bed at a rate of about 6.0 moles $H_2S$ per mole of Fe in the ore. The gases are preheated to provide an equilibrium fluid bed temperature of 1200° F. The contacting is carried out for a period of 120 minutes, and then hydrogen-$H_2O$ blend is replaced by 100% hydrogen gas. The latter gas is passed through the bed maintaining the bed at 1200° F. for an additional 60 minutes, and then the reducing gas is replaced with cold dry nitrogen. The dry nitrogen is passed through the bed until it is cooled to ambient temperature, at which time a sample of the particulate ore is analyzed for percent metallization. The term "metallization" as used herein means the percent of total iron in the ore which is present as metallic iron.

A second sample of the ore to be tested is treated initially with the hydrogen at 1200° F. for 60 minutes without any pretreatment with the hydrogen-$H_2O$ blend. The sample is similarly cooled and analyzed for metallization. The two samples are compared in metallization to determine to what extent the ore was made resistant to reduction by the pretreatment with the hydrogen-$H_2O$ blend at low temperatures. When the difference in metallization is 5% or greater, i.e., when the ore which is not pretreated is reduced to at least 5% higher metallization than the pretreated ore, then the ore is characterized as being a "sensitive ore." On the other hand, if the difference in the degree of metallization between the two samples is less than 5%, the ore is characterized as being "insensitive."

A demonstration of the test procedure is carried out with a granular hematite-limonite ore from Venezuela, known as Cerro Bolivar ore, a specular hematite ore from Brazil and an essentially earthy hematite ore from Liberia with the following results:

|  | Hematite-limonite | | Specular hematite | | Earthy hematite | |
|---|---|---|---|---|---|---|
| Prereduction with 67% $H_2$–33% $H_2O$ | Yes | No | Yes | No | Yes | No |
| Final reduction with 100% $H_2$ | Yes | Yes | Yes | Yes | Yes | Yes |
| Product metallization | 96 | 98 | 78 | 96 | 96 | 98 |
| Ore classification | Insensitive | | Sensitive | | Insensitive | |

The invention has been described in considerable detail for illustrative purposes. Applicant does not intend to be bound, however, to the particular embodiment described. The invention has utility in any staged fluidized iron ore reduction process in which a fluidized bed can be maintained under appropriate conditions to avoid sensitizing a sensitive ore feed and in which a preceding bed can be maintained under conditions which are appropriate to take advantage of the water-gas shift reaction. Numerous variations will be apparent to one skilled in the art, and applicant intends that full scope of the broad invention be given to the attached claims:

What is claimed is:

1. A process for simultaneously reducing sensitive and insensitive, particulate, oxidic, iron ore by passing said ore through a series of reduction stages in countercurrent contact with reducing gases whereby said ore is progressively reduced in each successive stage and said reducing gas is progressively oxidized in each stage, comprising:

feeding said insensitive ore to an initial stage of a series of fluidized reduction stages and adding said sensitive ore to a subsequent stage of said series;

maintaining in said initial stage temperatures ranging from about 800° F. to about 1200° F. and reducing gas compositions corresponding to reducing powers ranging less than about 2.0;

maintaining in said subsequent stage temperatures ranging above about 1350° F. and reducing gas compositions corresponding to reducing powers ranging above about 2.0;

and passing both ores through additional stages of the series countercurrent to a reducing gas, whereby the stages are fluidized and the ores are progressively reduced at least partially to metallic iron.

2. The process of claim 1 wherein said intitial stage comprises the top stage of a fluidized iron ore reduction process.

3. The process of claim 2 wherein said subsequent stage comprises the stage immediately below the top stage.

4. The process of claim 1 wherein said insensitive ore comprises at least 20% of the total insensitive and sensitive ore feeds.

5. The process of claim 1 wherein said sensitive ore comprises about 25% to about 50% of the total insensitive and sensitive ore feeds.

6. The process of claim 1 wherein the sensitive ore feed is preheated to temperatures ranging from about 1350° F. to about 1600° F. before being fed to said subsequent stage.

7. The process of claim 1 wherein said sensitive ore feed comprises essentially specular hematite.

8. The process of claim 7 wherein said insensitive ore feed comprises an earthy hematite.

9. The process of claim 7 wherein said insensitive ore feed comprises a hematite-limonite ore.

References Cited

UNITED STATES PATENTS

| | | | |
|---|---|---|---|
| 2,864,686 | 12/1958 | Agarwal | 75—26 X |
| 2,864,688 | 12/1958 | Reed | 75—26 |
| 3,205,065 | 9/1965 | Mayer et al. | 75—26 |
| 3,246,978 | 4/1966 | Porter, Jr., et al. | 75—26 |
| 3,428,446 | 2/1969 | Locke, Jr. | 75—26 |

WINSTON A. DOUGLAS, Primary Examiner

M. J. ANDREWS, Assistant Examiner

U.S. Cl. X.R.

75—9, 34